US005276817A

United States Patent [19]

Matschke et al.

[11] Patent Number: 5,276,817

[45] Date of Patent: Jan. 4, 1994

[54] SYSTEM FOR SPLITTING AND CONNECTING COMPUTER BUS LINES

[75] Inventors: Manfred Matschke, Gutersloh; Achim Rubert, Borgentreich, both of Fed. Rep. of Germany; Miroslaw Paczesny; Marek Rakowski, both of Gdansk, Poland

[73] Assignee: Technosales Company Establishment, Vaduz, Liechtenstein

[21] Appl. No.: 744,475

[22] Filed: Aug. 12, 1991

[30] Foreign Application Priority Data

Aug. 16, 1990 [DE] Fed. Rep. of Germany ....... 4025954
Apr. 23, 1991 [EP] European Pat. Off. ........ 91106492.1

[51] Int. Cl.[5] .......................... G06F 3/00; H01R 9/09; G09G 5/00; G09G 1/16

[52] U.S. Cl. .................................... 395/275; 395/162; 439/61; 439/59; 439/67; 439/493; 439/69; 439/77; 439/632; 361/680; 361/683; 361/785

[58] Field of Search ............... 395/160, 162, 163, 164, 395/165, 166, 250, 275, 800; 364/716, 717; 439/59, 60, 61, 62, 63, 64, 65, 66, 67, 68, 69, 70, 77, 632, 493; 361/413, 499

[56] References Cited

U.S. PATENT DOCUMENTS

| | | | |
|---|---|---|---|
| 3,319,216 | 5/1967 | McCullough | 439/67 |
| 4,113,981 | 9/1978 | Fujita et al. | 174/88 |
| 4,926,166 | 5/1990 | Fujisawa et al. | 340/717 |
| 4,939,509 | 7/1990 | Bartholomew et al. | 340/717 |
| 4,965,560 | 10/1990 | Riley | 340/717 |
| 4,971,563 | 11/1990 | Wells, III | 439/61 |
| 4,979,075 | 12/1990 | Murphy | 361/399 |
| 5,123,092 | 6/1992 | Buxton et al. | 395/250 |
| 5,136,694 | 8/1992 | Belt et al. | 395/275 |

FOREIGN PATENT DOCUMENTS

| | | |
|---|---|---|
| 070071 | 7/1982 | European Pat. Off. . |
| 112050 | 11/1983 | European Pat. Off. . |
| 112144 | 12/1983 | European Pat. Off. . |
| 2112449 | 10/1971 | Fed. Rep. of Germany . |

OTHER PUBLICATIONS

European Search Report dated Mar. 15, 1993 in corresponding European Patent Application 91 10 6492.
Patent Abstracts of Japan, vol. 15, No. 15, Jan. 11, 1991.
Patent Abstracts of Japan, vol. 7, No. 238, Oct. 1983.
Patent Abstracts of Japan, vol. 12, No. 220, Jun. 23, 1988.
Patent Abstracts of Japan, vol. 11, No. 386, Dec. 17, 1987.

*Primary Examiner*—Parshotam S. Lall
*Assistant Examiner*—Timothy Lee Philipp
*Attorney, Agent, or Firm*—Collard & Roe

[57] ABSTRACT

A system for splitting and connecting computer bus lines, including a ribbon cable with a flat end connector which is piggy-backed to the contact strip of a circuit board. The circuit board is then plugged into a bus slot with the flat end connector insulating selected terminal contacts of the slot from said contact strip. The ribbon connector is connected to the circuit board, the terminal contacts, the contract strip, or both. A control signal selector connected to the other end of the ribbon cable sends signals to one of several circuit boards so as to allow more than one work station to be supported by a single microprocessor.

8 Claims, 10 Drawing Sheets

SYSTEM FOR SPLITTING AND CONNECTING COMPUTER BUS LINES

BACKGROUND OF THE INVENTION

1. Field of the Invention

The present invention relates to a system for splitting and connecting computer bus lines, especially on the mother board of a personal computer. More particularly, it relates to an electronic switching system which provides work stations for two or more users. The electronic switching system also allows several programs to run on a work station, i.e., multitasking. The switching system can operate under standard operating systems, for example, PC/DOS or MS/DOS® (referred to generally as DOS), and multi-user operating systems, e.g., Xenix® and Unix®.

2. The Prior Art

With existing personal computers, there is often the need to split or connect individual bus lines based on requirements of the software. According to the prior art, such a change was only possible with extensive hardware changes on the mother board and/or cards.

Under the DOS operating system, personal computers of a known type currently support only a single work station, with one monitor and one keyboard, i.e., a single-user system. Many programs, however, demand relatively little processor time, peripheral involvement, or memory. As a result, the hardware capabilities are not utilized to their full capacity with the single-user system. It would therefore be practical in terms of the hardware to have parallel operations by several users at several work stations with multiple programs running at each work station.

Prior art networks, which connect personal computers together, run programs separately on each computer. Data or programs can be reciprocally exchanged through a file server and peripherals such as printers and disk drives can be shared. The necessity of acquiring a suitable personal computer for each work station, as well as the hardware and software for operating the network, is costly. The system according to the invention allows an IBM®-compatible PC to be used as a two-user or multi-user system with simultaneous multitasking capabilities, using conventional monitors, video cards and standard operating systems, such as DOS or multi-user operating systems.

SUMMARY OF THE INVENTION

It is therefore an object of the present invention to eliminate the aforesaid drawbacks of the prior art and to provide a system for easily and quickly splitting and connecting computer bus lines.

It is a further object of the present invention to provide such a system which does not require hardware changes on any cards or the mother board.

It is yet another object of the present invention to provide a personal computer with multiple work stations with multitasking capabilities.

These and other related objects are attained according to the invention by an electronic switching system having a ribbon cable which is inserted into a slot on the mother board between the contacts of that slot and the circuit board residing in the slot. The ribbon cable can be connected to the circuit board contacts while insulating the corresponding slot contacts. Alternatively, the ribbon cable can be connected to the slot contacts while insulating the corresponding circuit board contacts. Furthermore, the ribbon cable can be connected to both the circuit board contacts and the corresponding slot contacts. In a further advantageous embodiment the end of the ribbon cable which is inserted into the slot is provided with an adhesive layer for attachment to the circuit board. If the circuit board contacts are to be insulated, the adhesive may cover the entire contact. The ribbon cable then goes to an electronic switching system which controls signals that would ordinarily flow uninterrupted from the bus slot to the cards.

With the system according to the invention, an essential advantage is achieved by simply attaching the ribbon cable to the circuit board contacts. In this manner, any desired split or connection of bus lines can be quickly and effectively achieved by piggy-backing the ribbon cable to the circuit board and inserting both into the slot. In this way, any desired connection and insulation of the individual contacts is possible, as required, for example, by the software or a different computer configuration.

A significant cost reduction for a two-user or multi-user system is possible using all the existing components of a PC. The only additional item required is an electronic switching arrangement according to the invention for splitting and connecting the bus lines and additional peripherals, such as monitors, video cards, and keyboards, which are currently available. The electronic switching system makes multi-user/multi-tasking possible with 8088/8086 and compatible processors using DOS.

The electronic switching system includes a decoder, a keyboard controller, and a control signal selector, which are all connected to the system bus of the mother board. A second keyboard is connected to the keyboard controller and all video cards and monitors are connected to the control signal selector. The decoder then sends control signals to the keyboard controller and signal selector to select between the two keyboards and video cards. The ribbon connector is used to divert video signals from the mother board to the signal selector. The selector then routs the signal to the original video board via one of the ribbon cables or the additional video board. The first keyboard remains on the standard keyboard input of the computer, and the second or any further one(s) is/are connected to the keyboard controller.

Division and management of the memory, the time sharing of the processor as well as alternating use of the PC peripherals, is controlled by software specifically developed for this purpose. The software must run before start-up of the second or any additional work stations, or to change the configuration. Alternatively, signals can be directed by jumpers, dip switches or digital selectors to ribbon cables which are connected to other circuit boards. The switching system can also be adapted for use with an AT or AT-compatible PC.

Alternatively, it is also possible to provide an external bus expansion card, which is connected with the computer via a connection cable plugged into a slot of the computer. The bus expansion card would contain slots for additional cards and would connect those slots directly to the PC bus or indirectly through a switching system. The switching system would have a decoder, a keyboard controller and a control signal selector.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawing is designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
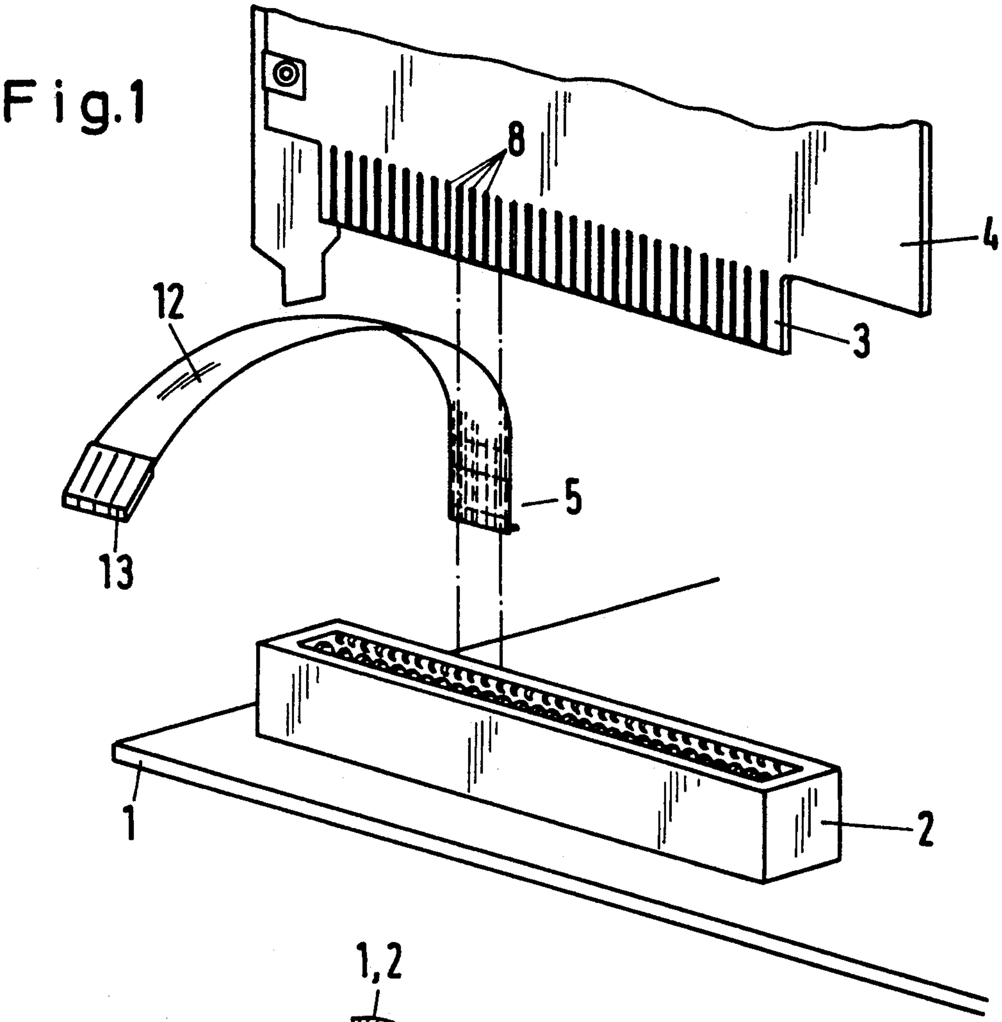
FIG. 1 is an exploded perspective view of a portion of the switching system embodying the present invention.
Figure 2:
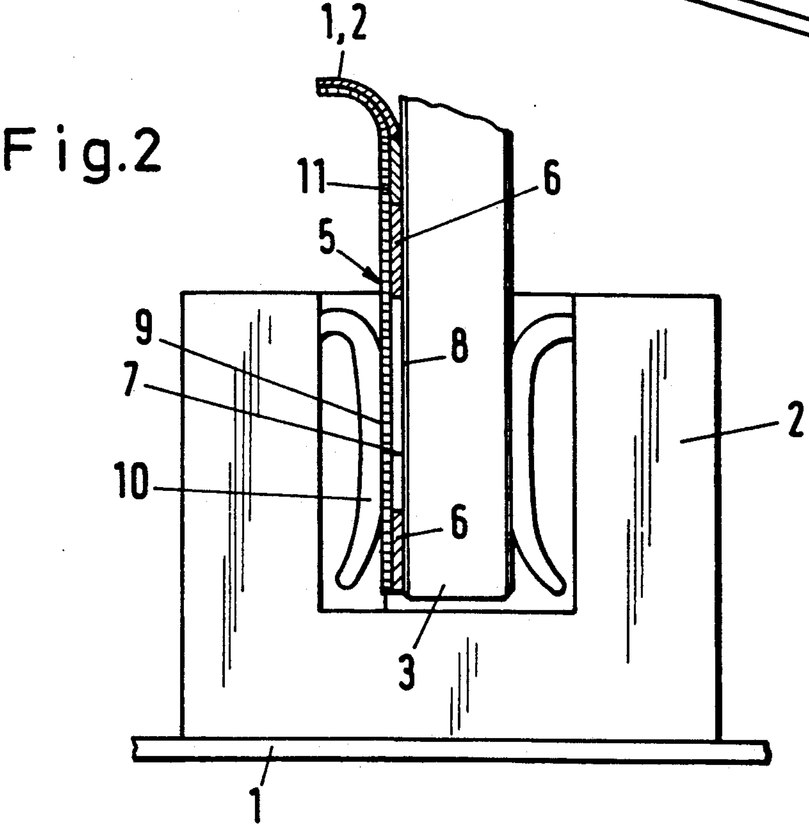
FIG. 2 is an enlarged cross-sectional view of the slot.

Turning now in detail to the drawings, and in particular, FIGS. 1 and 2, there is shown a slot 2 which is affixed to a mother board 1 of a PC. The contacts of slot 2 are soldered to the corresponding contacts on the bottom of the mother board 1. Of course, in a computer, several slots are attached to mother board 1.

A contact strip 3 of a card 4, for example, in the form of a video card or similar card, can be inserted into slot 2. Ribbon connector 12 has an end 5 which is provided with adhesive layers 6. Ribbon connector contacts 7 are placed against circuit board contacts 8 and held in place by adhesive layers 6. An insulating layer 9 insulates terminal contacts 10 from contacts 7 or 8. Lines 11 of ribbon connector 12 are connected to contacts 7 and 8.

In other words, the arrangement according to the invention allows any desired contacts of contact strip 3 of one or more cards or adapters to be insulated from terminal contacts 10. In an XT or XT-compatible, lines 11 would be connected to bus lines IOWR, IORD, MEMWR and MEMRD. In an AT or AT-compatible, bus line LA-19 would additionally be connected to lines 11.

End 5 can also be installed rotated by 180°, so that contact between terminal contacts 10 and ribbon connector contacts 7 is achieved. Any alternating arrangements of these connections or insulations is possible. For example, end 5 can have one set of contacts connected to the terminal contacts 10 and a separate set of contacts connected to contacts 8.

Figure 3:
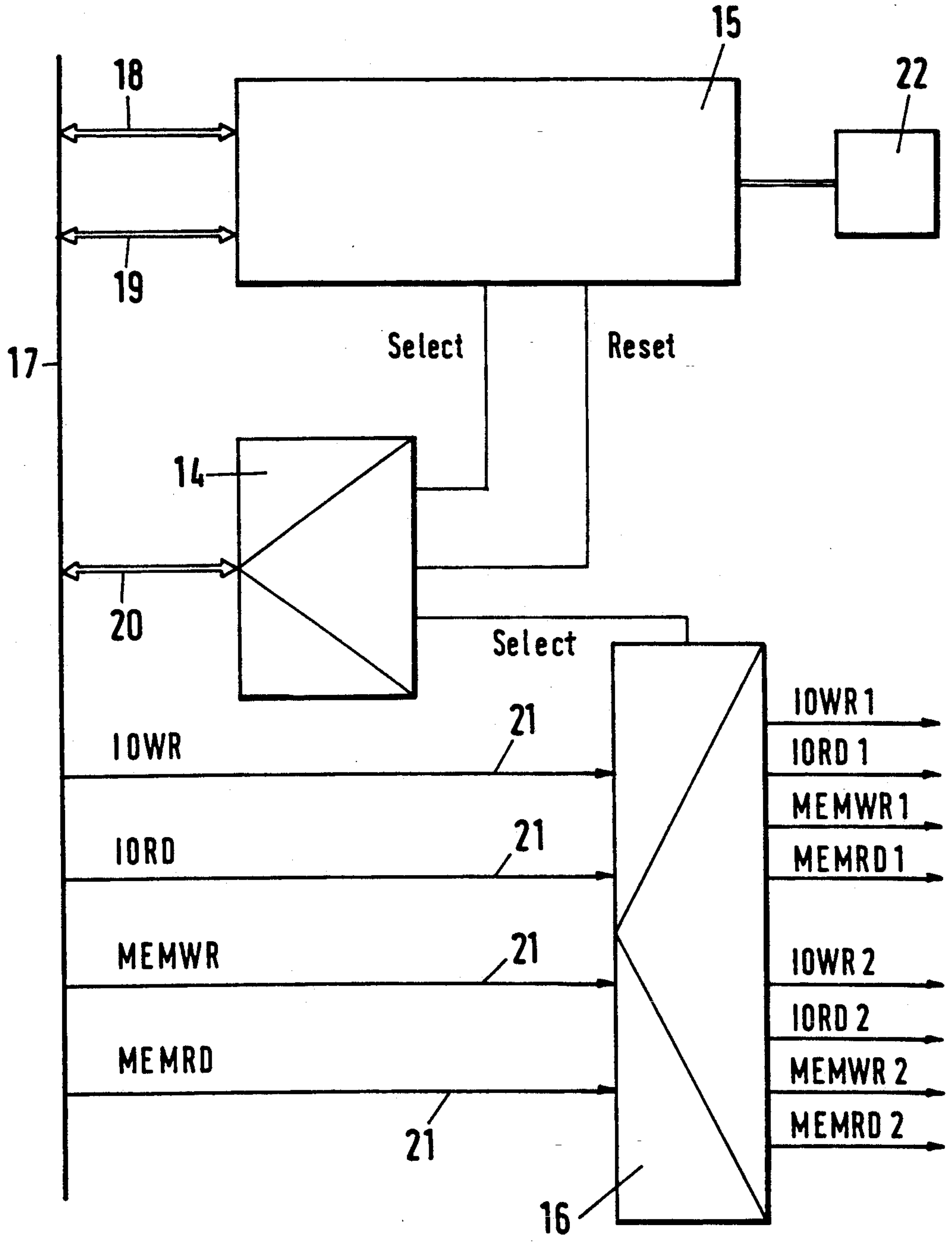
FIG. 3 is a basic block diagram of the switching system according to the invention.

In FIG. 3, the switching system is described using, for example, a two-user system. It is possible to utilize the system to create a multi-user system as well.

The switching arrangement essentially consists of three modules, namely, a decoder 14, a keyboard controller 15 and a control signal selector 16. All three modules are connected with a system bus 17 of the mother board. Keyboard controller 15 is connected to the data and/or I/O bus lines 18, 19. Decoder 14 is connected to the I/O bus lines 20, and the control signal selector 16 is connected to the I/O and memory bus lines IOWR, IORD, MEMWR and MEMRD 21.

A second keyboard 22 is connected to keyboard 15, and any desired video card of the industry standard (e.g. HGC, EGA, VGA) is connected to each of four outputs IOWRi, IORDi, MEMWRi and MEMRDi ($i=1$ or 2) of the control signal selector 16. Decoder 14 serves for address coding and has to send the corresponding control signals to selector 16, i.e., from the keyboard controller 15. The keyboard controller 15 takes over organization of the data transfer between the second keyboard 22 and the system processor, in that serial data is converted to parallel data, and vice versa. The function of the keyboard controller 15 and control signal selector 16 are independent, as a matter of principle, but logically, they are organized jointly by expanded operating system software, and made into an integrated switching system by use of the common decoder 14.

Figure 4:
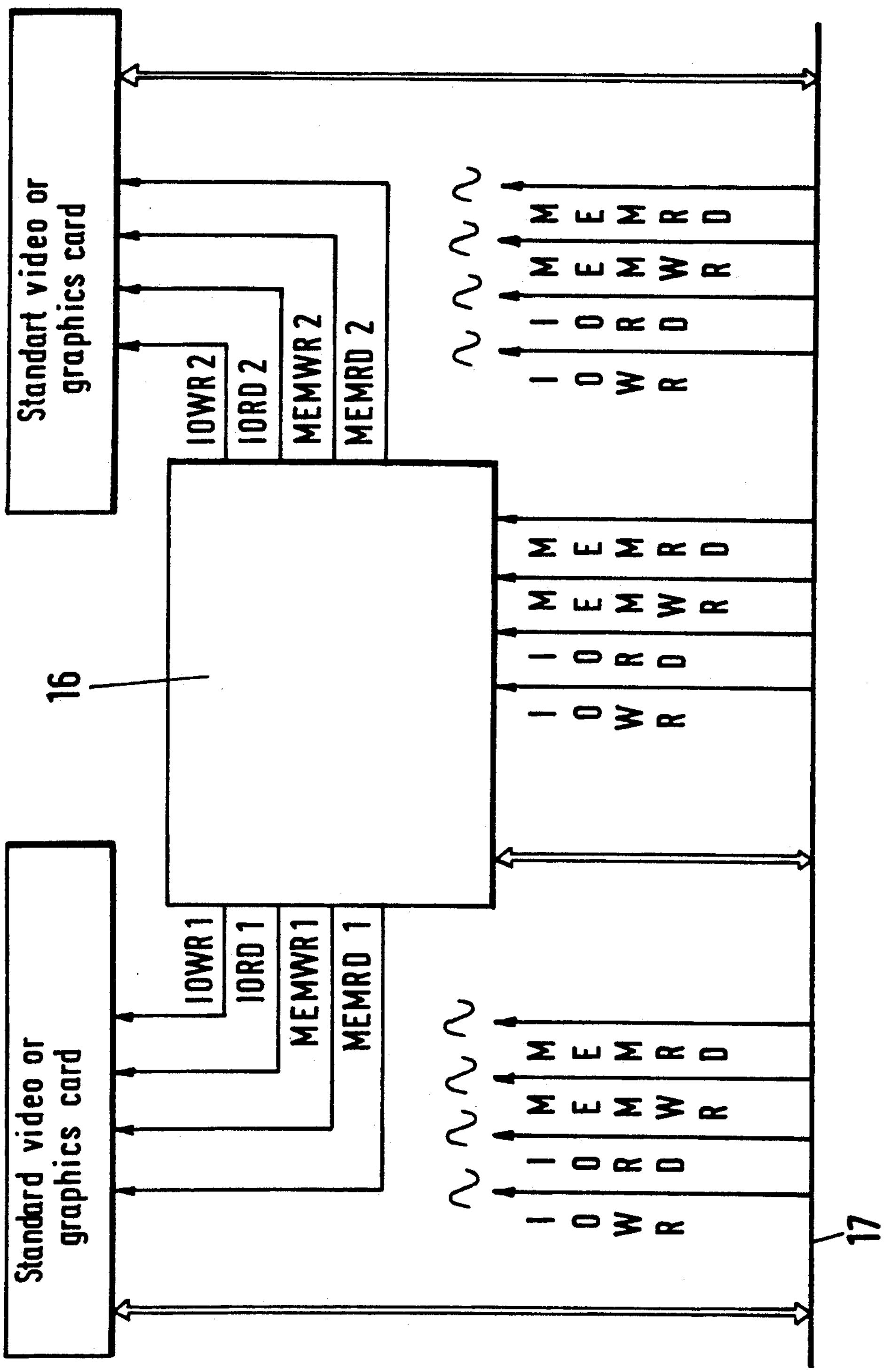
FIG. 4 is a schematic view of the switching system.

In order to eliminate the address conflict between video cards of the same type, before their installation in the slots of the computer, the four card contacts which belong to the bus lines IOWR, IORD, MEMWR and MEMRD are insulated from the slot contacts and attached to control signal selector 16 so that a switching arrangement such as the one shown in FIG. 4 is obtained. The other end of ribbon connector 12 attaches bus lines IOWR, IORD, MEMWR and MEMRD to control signal selector 16. Finally, a second video card is attached to the control signal 16. In this way, both video cards receive the IOWR, IORD, MEMWR and MEMRD signals from control signal selector 16 of the switching system, instead of from the system bus 17 of the mother board.

The switching arrangement according to the invention achieves the significant advantage that graphics-capable multi-user operation becomes possible using specially developed software together with two or more commercially available monitors, video cards and keyboards. Any desired division of the working memory and the processor time can be made without altering the hardware configuration.

Figure 5:
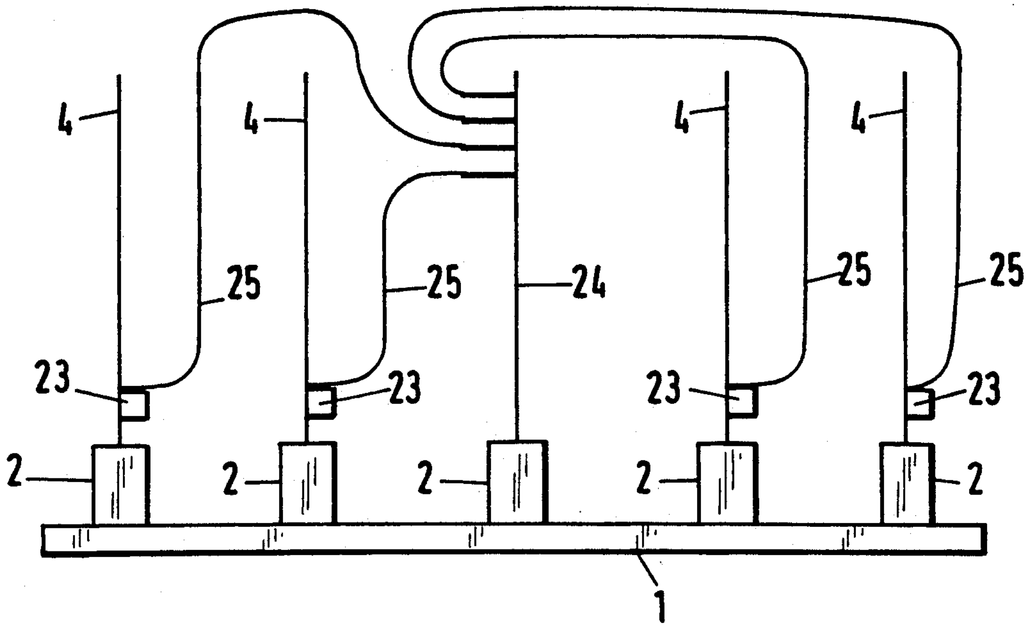
FIG. 5 is a schematic view of an alternate embodiment of the switching system.

FIG. 5 shows a further possibility for splitting and connecting the bus lines. There, several cards 4 can be inserted into slots 2 of the bus of the mother board 1. Cards 4 have jumpers, digital sensors or dip switches 23 in the vicinity of the bus lines, between the contacts and the actual electronics. With this, any desired number of lines can be separated specifically in such a way that signals are passed to additional cards from a special switching system 24 inserted into slot 2 of mother board 1, via external cables 25 and, if necessary, plug-in connections.

Figure 6A:
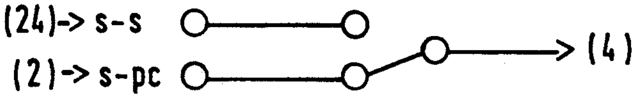
FIG. 6A is a schematic view of a switch for a single conductor.

The switching principle is shown for a conductor in FIG. 6*a*. In this case, the absence of the jumper allows the signal s-s (signal-switching system) to be passed from the additional switching system to an additional card 4. The use of a jumper would produce the normal bus line s-pc (signal—PC bus) from the slot 2 of the PC to the additional card 4.

Figure 6B:
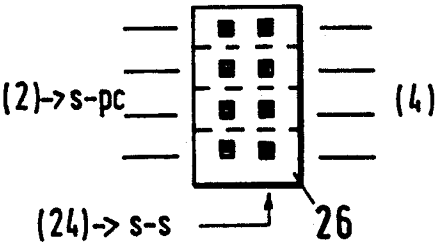
FIG. 6B is a schematic view of a switch for a set of four conductors.

FIG. 6*b* shows the technical implementation for four lines, with two four-pole contact strips 26. If jumpers are set horizontally on two adjacent pins, the normal bus line s-pc from slot 2 of the PC to the additional card 4 is produced. On the other hand, a plug can be attached to the right, vertical terminal strip, which passes the signals from the special switching arrangement 24 to the electronics of the additional card via the cable 25.

Figure 7:
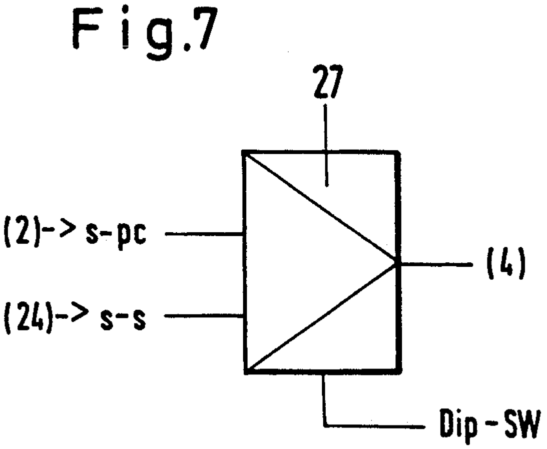
FIG. 7 is a schematic view of a dip switch and selector.

FIG. 7 shows the use of digital selectors 27 in connection with dip switches, as an alternative to jumpers.

Figure 8:
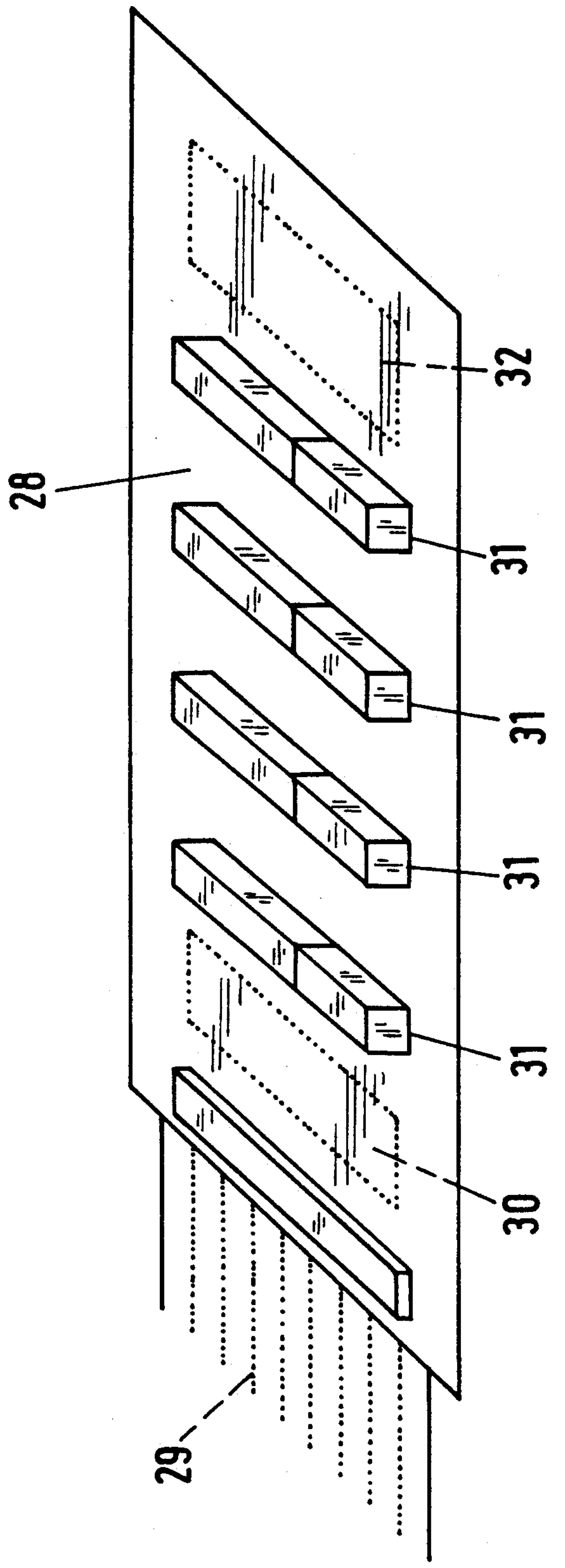
FIG. 8 is a schematic view of a bus expansion card.

A bus expansion card 28 is shown in FIG. 8 which is located outside the PC and receives the bus signals of the PC through a connection cable 29, which is inserted into a free slot of bus slot 2, from the PC.

A special switching arrangement 30 is implemented according to the principle shown in FIGS. 6 and 7. This switching arrangement 30 allows optional feed of the signals (s-pc) into special contact strips 31 directly from the PC bus, via the connection cable 29, or of the signals (s-s) from an additional switching arrangement 32, which is integrated into the circuit board of the bus expansion card 28. This switching arrangement 32 approximately corresponds to the switching arrangement 24 of FIG. 5. The bus expansion card furthermore possesses any desired number of contact strips 31—shown with four contact strips in the present case—into which any desired number of additional cards 4 can be inserted.

Figure 9:
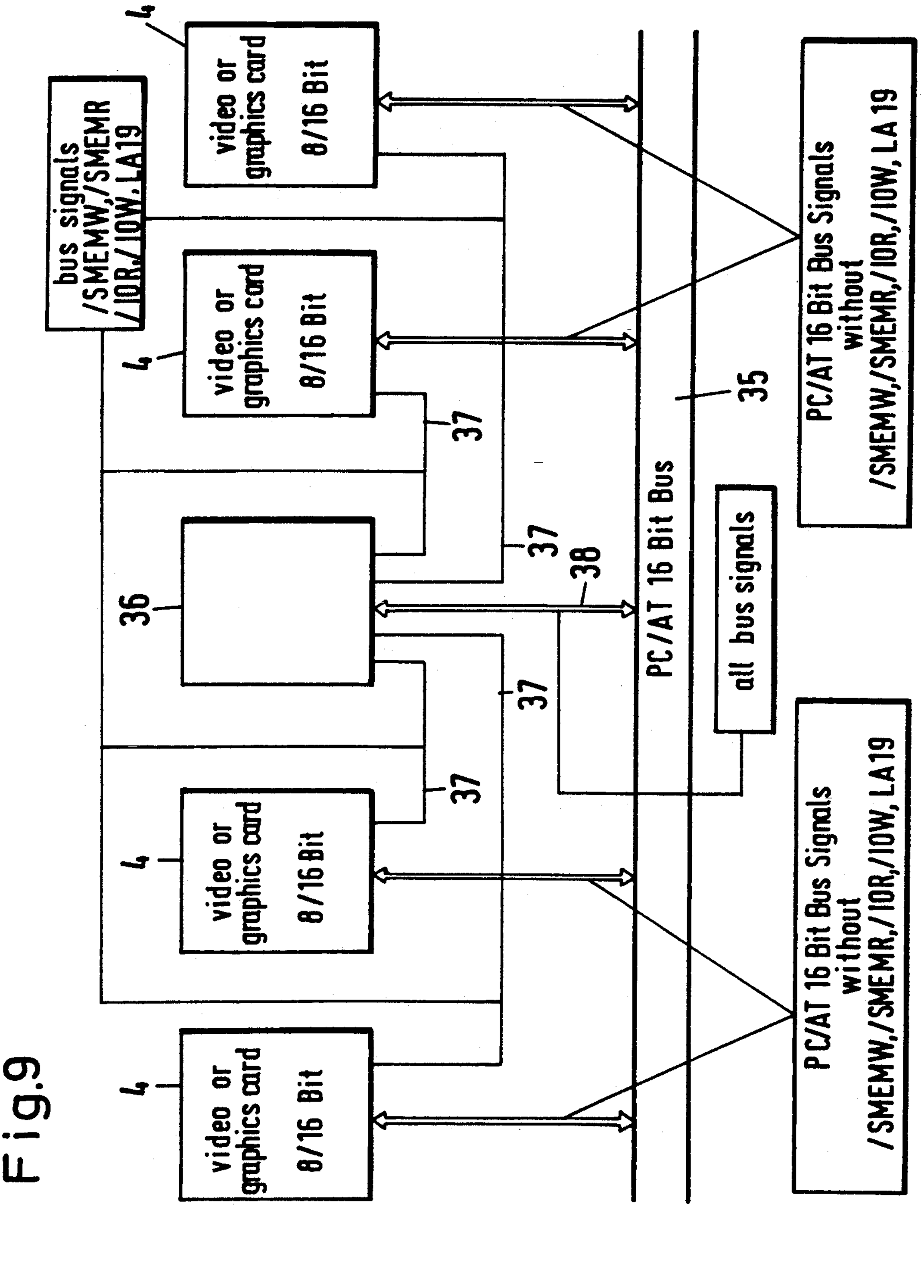
FIG. 9 is a schematic view of a switching system supporting four work stations.

FIG. 9 shows an overview plan for the multi-user principle of a PC, for example, a four-user version. The four graphics cards 4 contain all the necessary bus lines directly from the PC bus 35, with the exception of the signals /SMEMW, SMEMR, /IOW and /IOR (for 8 bit graphics cards; XT bus) as well as additionally LA19 (for 16 bit graphics cards; AT® bus), or corresponding additional conductors for 32 bit graphics cards (EISA bus). These signals are transmitted separately to the cards 4 by means of an additional switching arrangement 36 and operating system software, via special, external cables or integrated tracks 37. The switching arrangement 36 receives its signals directly from the PC bus lines 38.

Figure 10:
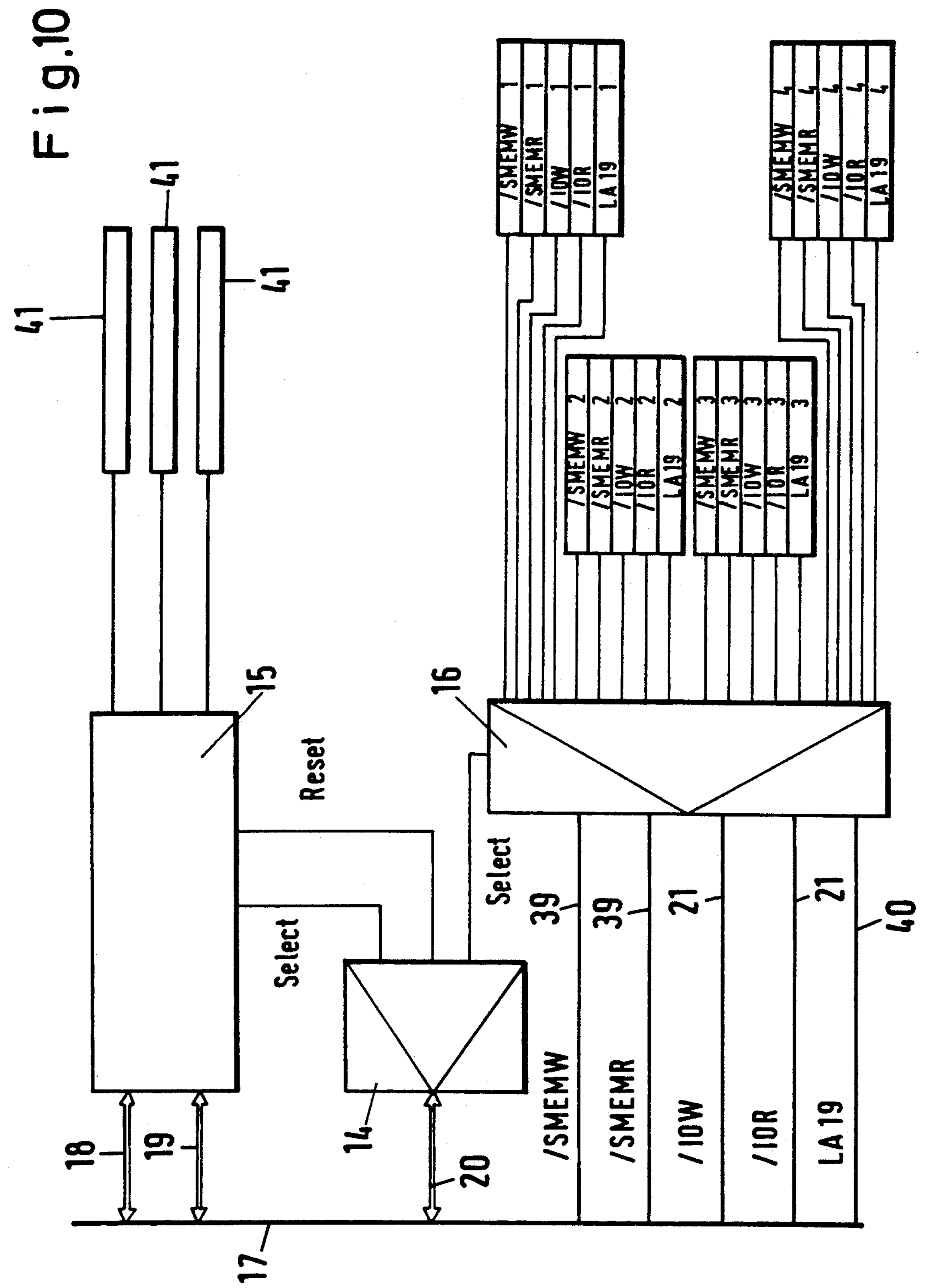
FIG. 10 is an extended block diagram of the diagram in FIG. 3.

FIG. 10, expanding on FIG. 3, shows a basic block diagram of the additional switching system for four-user operation with 16-bit graphics cards, where the bus lines SMEMW and /SMEMR 39 and the LA19 line (40), which lead to the control signal selector 16, are added to the I/O bus lines 21.

Figure 11:
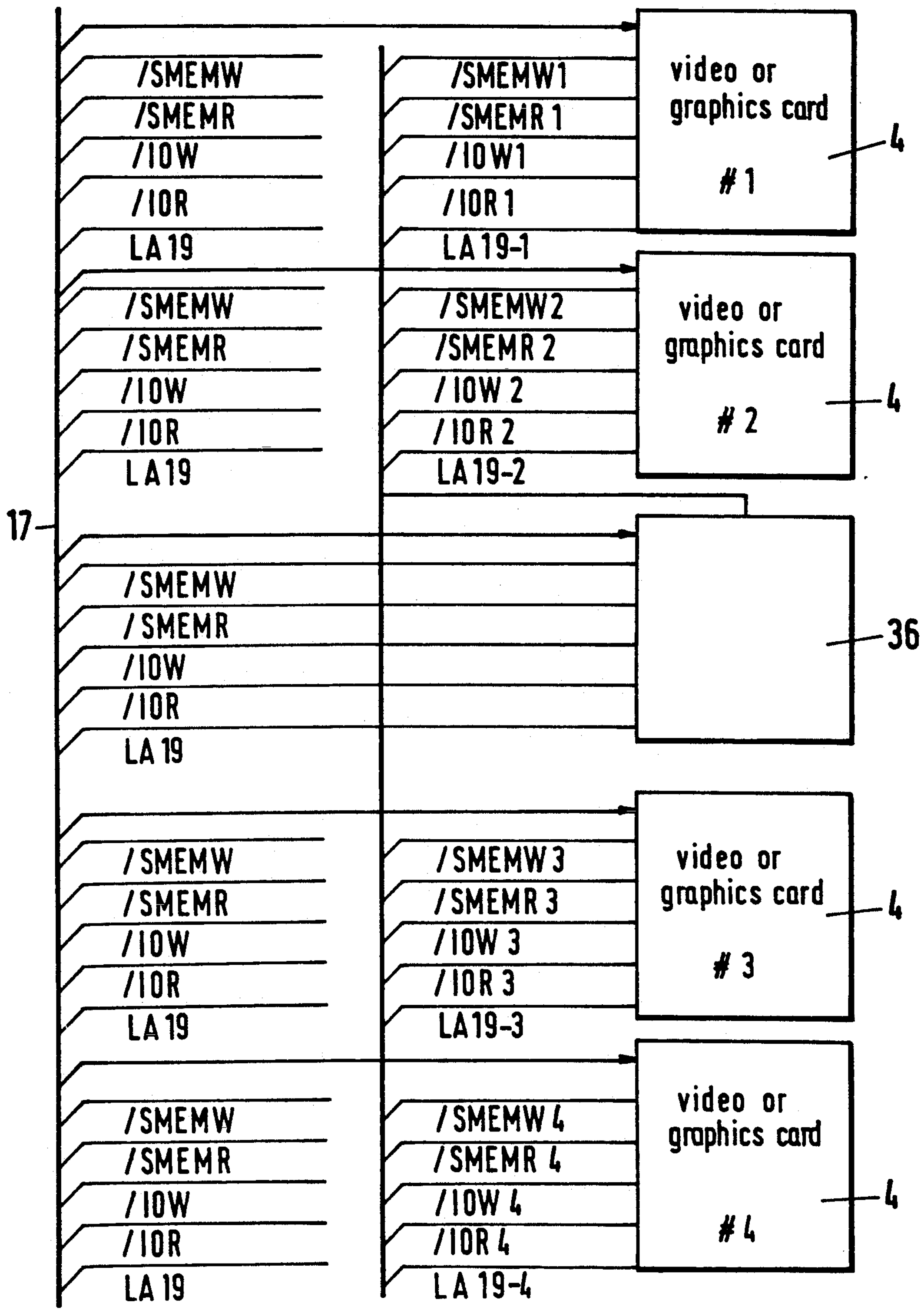
FIG. 11 is an extended schematic view of the diagram in FIG. 4.

FIG. 11 shows an expansion of the switching arrangement according to FIG. 4, and contains the principle of bus separation for the bus lines /SMEMW, /SMEMR, /IOW, /IOR, as well as LA19. The additional switching arrangement 36 is correspondingly connected with cards 4, as presented above, which are designated as #1, #2, #3, #4 in the example shown.

Figure 12:
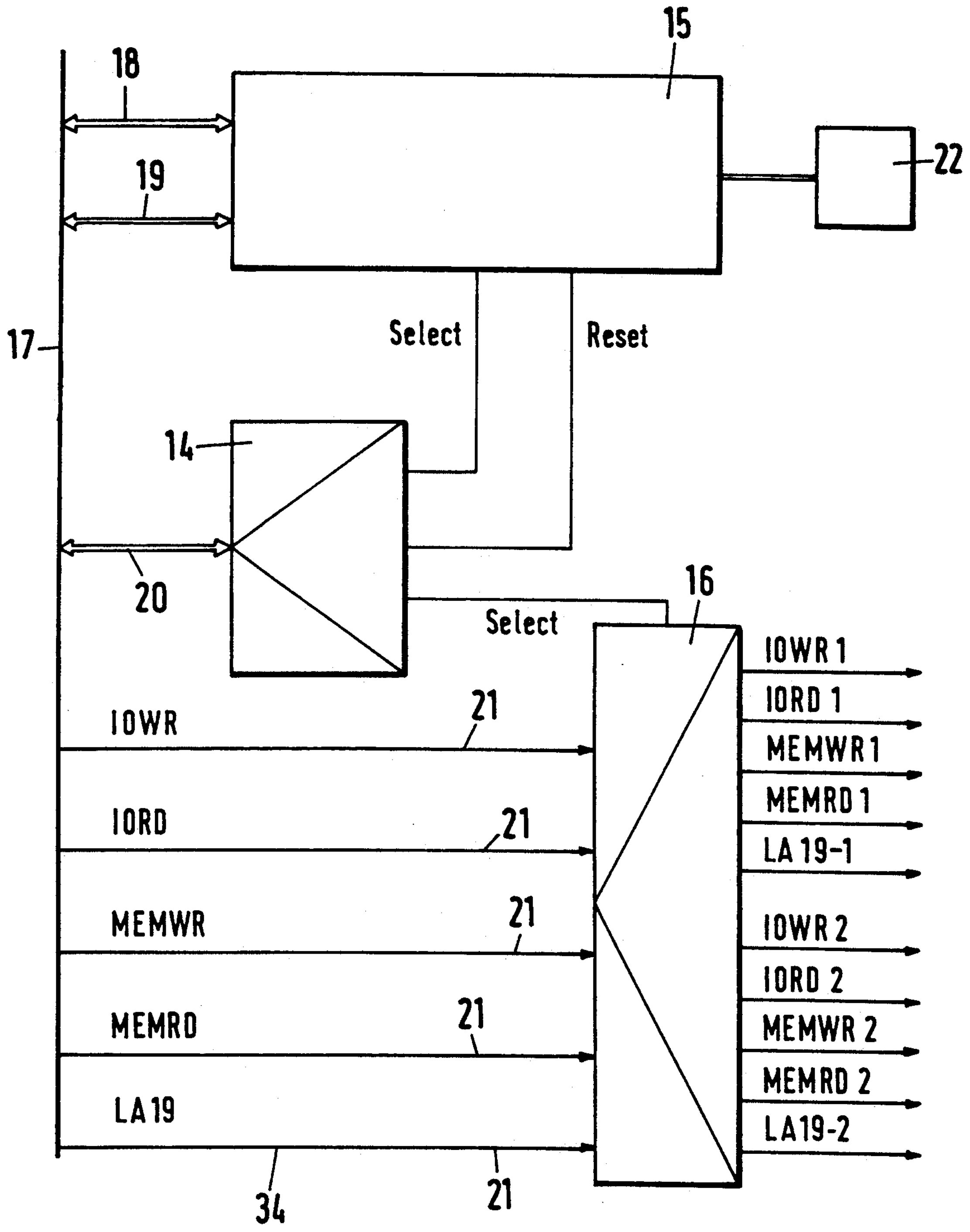
FIG. 12 is an extended block diagram of the diagram in FIG. 3.

FIG. 12 shows an expansion of the basic block diagram according to FIG. 3, where the line LA-19 34 for an AT® bus is also present.

Figure 13:
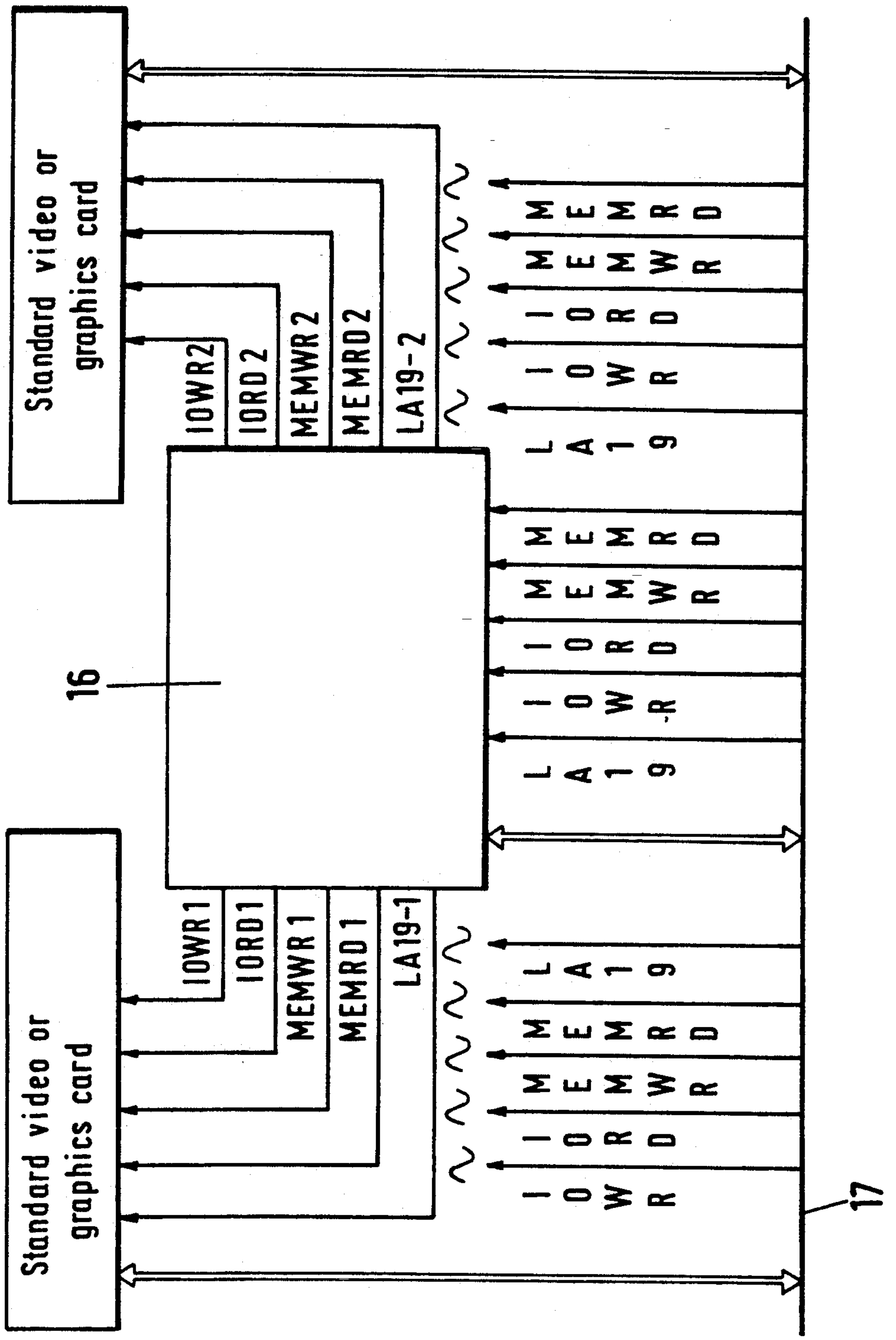
FIG. 13 is an extended schematic view of the diagram in FIG. 4.

FIG. 13 shows an expansion of the basic block diagram according to FIG. 4, where the line LA-19 for an AT® bus is to be additionally split.

While only two embodiments of the present invention have been shown and described, it is to be understood that many changes and modifications may be made thereunto without departing from the spirit and scope of the invention as defined in the appended claims.

What is claimed is:

1. A system for splitting and connecting I/O, data and memory computer bus lines having a first keyboard, a first monitor, and a first video circuit board with a contact strip for plugging into a slot with terminal contacts for electrically connecting said contact strip said terminal contacts, comprising:

a ribbon cable with a first end connector, wherein said first end connector is flat and affixed, in a piggy-back fashion, to said contact strip of said first video circuit and electrically connected to at least one of said contact strip and said terminal contacts; and plugged into said slot to insulate, by position placement of said first end connector on said contact strip of said circuit board, selected terminal contacts from said contact strip.

2. The system according to claim 1, wherein said first flat end connector of said cable includes two sides thereof, a first side having ribbon cable contacts and being electrically connected to said contact strip, a second side opposite said first side having electrical insulation thereon and abutting said terminal contacts.

3. The system according to claim 1, wherein said first flat end connector of said cable includes two sides thereof, a first side having ribbon cable contacts and being electrically connected to said terminal contacts, a second side opposite said first side having electrical insulation thereon and abutting said contact strip.

4. The system according to claim 1, wherein said first flat end connector of said cable has ribbon cable contacts and is electrically connected to said contact strip and said terminal contacts.

5. The system according to claim 1, wherein said first flat end connector of said cable includes opposite side thereof, said first side having an adhesive strip for removable attachment to said first video circuit board.

6. A system for splitting and connecting I/O, data and memory computer bus lines having a microprocessor, a first keyboard, a first monitor, and a first video circuit board with a contact strip for plugging into a slot with terminal contacts for electrically connecting said contact strip to said terminal contacts, the system comprises:

a ribbon cable with two end connectors, wherein said first end connector is flat and affixed, in a piggy-back fashion, to said contact strip of said first video circuit board and plugged into said slot to insulate, by position placement of said first end connector on said contact strip of said circuit board, selected terminal contacts from said contact strip;

said first flat end connector including a first side and a second side disposed opposite said first side, said first side having ribbon cable contacts and being electrically connected to said contact strip, said second side having electrical insulation thereon and abutting said terminal contacts;

a decoder connected to the I/O bus lines;

a control signal selector controlled by said decoder and connected to said I/O and memory bus lines IOWR, IORD, MEMWR and MEMRD;

a second video circuit board connected to said control signal selector;

said second end connector of said ribbon cable being coupled to said control signal selector so that said ribbon cable connects said first video circuit board to said control signal selector;

a keyboard controller controlled by said decoder and connected to said data and I/O bus lines; and a second keyboard connected to said keyboard controller, said decoder coordinating data transfer between said two keyboards, said two video circuit boards and said system microprocessor so as to allow more than one work station to be supported by a single microprocessor.

7. They system according to claim 6, wherein said first video circuit board is the same as another as said second video circuit board and is selected from a group consisting of HGC, EGA and VGA graphics board.

8. The system according to claim 7, wherein said control signal selector is additionally connected to a bus line LA-19 for an IBM AT model.

* * * * *